US006550836B2

(12) United States Patent
Rigau (10) Patent No.: US 6,550,836 B2
(45) Date of Patent: Apr. 22, 2003

(54) VEHICLE BED MODULAR SYSTEM AND METHOD THEREFOR

(76) Inventor: John Rigau, 13239 N. 78 St., Scottsdale, AZ (US) 85260-4009

( * ) Notice: Subject to any disclaimer, the term of this patent is extended or adjusted under 35 U.S.C. 154(b) by 0 days.

(21) Appl. No.: 09/772,311

(22) Filed: Jan. 29, 2001

(65) Prior Publication Data
US 2002/0101088 A1 Aug. 1, 2002

(51) Int. Cl.$^7$ ................................................. B67C 1/06
(52) U.S. Cl. .................................... 296/37.6; 296/26.08
(58) Field of Search ........................... 296/37.6, 26.08, 296/26.11, 57.1

(56) References Cited

U.S. PATENT DOCUMENTS

| | | |
|---|---|---|
| 4,472,639 A | 9/1984 | Bianchi |
| 4,531,773 A | 7/1985 | Smith |
| 4,596,417 A | 6/1986 | Bennett |
| 4,778,213 A | 10/1988 | Palmer |
| 5,468,038 A | 11/1995 | Sauri |
| 5,478,130 A | 12/1995 | Matulin et al. |
| 5,700,047 A | 12/1997 | Leitner et al. |
| 5,800,145 A | 9/1998 | Kelce |
| 5,816,637 A | 10/1998 | Adams et al. |
| 5,816,638 A | 10/1998 | Pool, III |
| 5,823,596 A * | 10/1998 | Kulesza .................... 296/26.08 |
| 5,868,449 A | 2/1999 | Hitchcock |
| D417,859 S | 12/1999 | Leitner et al. |
| D418,106 S | 12/1999 | Leitner et al. |
| 6,045,172 A | 4/2000 | Thomas |
| 6,120,076 A | 9/2000 | Adsit et al. |

* cited by examiner

Primary Examiner—Joseph D. Pape
(74) Attorney, Agent, or Firm—Jeffrey Weiss; Harry M. Weiss; Weiss, Moy & Harris, P.C.

(57) ABSTRACT

A modular system and method for increasing the functionality of a vehicle bed, consisting of a rectangular panel having substantially the width of a vehicle bed and mounting plates on the interior of the vehicle bed. The mounting plates are positioned so as to permit installation of a rectangular panel alternatively in a parallel and vertical orientation relative to the bed of the vehicle. Preferably, at least two rectangular panels are provided so that at least three of the following can be provided: a bed expander, storage unit, work shelf, rack system, ramp, seat, wind-deflector, and divider.

17 Claims, 10 Drawing Sheets

VEHICLE BED MODULAR SYSTEM AND METHOD THEREFOR

BACKGROUND OF THE INVENTION

1. Field of Invention

This invention relates generally to a system and method for increasing the functionality of a vehicle bed and, more specifically, to a system and method for increasing vehicle bed functionality by variously expanding capacity, providing a ramp, providing a rack system, providing a bed divider, providing storage compartments, providing a work shelf, providing a wind deflector and providing a seat.

2. Background of the Invention

Owners of vehicles (typically trucks) with beds have given a great deal of attention to improving the functionality of the bed. Among other things, efforts have been made—particularly as truck beds have grown shorter with the increased popularity of extended cab trucks and trucks having four doors—to increase the carrying volume of the truck bed by adding an extension type of apparatus. Examples of such apparatuses include U.S. Pat. No. Des. 418,106 issued to Leitner for a vehicle cargo bed extender; U.S. Pat. No. 5,868,449 issued to Hitchcock for an auxiliary tailboard assembly for drop-down tailgate; U.S. Pat. No. 5,816,638 issued to Pool for a pickup truck bed extender, ramp and tailgate; U.S. Pat. No. 5,816,637 issued to Adamas for a truck cargo space extension bed; U.S. Pat. No. 5,468,038 issued to Sauri for a multiple configuration tailgate extender; U.S. Pat. No. 6,120,076 issued to Adsit for a vehicle cargo bed extender and divider; U.S. Pat. No. 4,778,213 issued to Palmer for an extendable vehicle tailgate assembly; and others.

Truck owners are also fond of installing storage units within the truck bed, so that they may store in a relatively secure manner—from theft and/or the elements—tools or other items. Truck owners have also utilized the tail-gate of the truck bed for installing a work shelf or like apparatus.

Where a truck is to be used to transport vehicles, such as motorcycles, bicycles, etc., it is desirable to provide a ramp to allow such vehicles to be placed in the truck bed, and/or a rack upon which to position such vehicles (or other cargo) for transport. Still further, persons often like to travel in the truck bed or otherwise use the bed for relaxation, and the positioning of a seat therein would be beneficial for such purposes.

There are a number of significant drawbacks associated with prior art apparatuses. The most glaring drawback is that prior art apparatuses tend to focus on one or at best two particular needs—e.g., a storage unit, a work shelf, a bed expander, bed divider, or a seat—rather than on providing a single system capable of addressing a plurality of needs. Therefore, a need existed for a system and method for increasing the functionality of a vehicle bed, by providing multiple apparatuses, including by way of example three or more of a bed expander, storage unit, work shelf, rack system, ramp, divider, seat, and wind deflector and other features in a single, modular system. A need further existed for improving upon the individual prior art apparatuses in these areas. The present invention satisfies these needs and provides other, related, advantages.

SUMMARY OF THE INVENTION

It is an object of the present invention to provide a system and method for increasing the functionality of a vehicle bed.

It is a further object of the present invention to provide a modular system and method for increasing the functionality of a vehicle bed, by providing a plurality of features including three or more of the following: a bed expander, storage unit, work shelf, rack system, ramp, divider, seat, and wind deflector.

It is still a further object of the present invention to provide a modular system and method for increasing the functionality of a vehicle bed, by providing one or more of an improved bed expander, storage unit, work shelf, rack system, ramp, divider, seat, and wind deflector.

It is yet a further object of the present invention to provide a modular system and method for increasing the functionality of a vehicle bed, by providing a plurality of features including each of a bed expander, storage unit, work shelf, rack system, ramp, divider, seat, and wind deflector.

BRIEF DESCRIPTION OF THE PREFERRED EMBODIMENTS

In accordance with one embodiment of the present invention, a system for increasing vehicle bed functionality is provided. The system comprises, in combination: at least one rectangular panel having substantially the width of a vehicle bed and having male coupling members extending therefrom; and mounting plates adapted to be mounted to interior walls of said vehicle bed and having openings thereon dimensioned to receive said male coupling members so that said rectangular panel can be positioned in an orientation ranging from parallel to a floor of said vehicle bed to an orientation that is perpendicular to a floor of said vehicle bed.

In accordance with another embodiment of the present invention, a system for increasing vehicle bed functionality is provided. The system comprises, in combination: at least one rectangular panel having substantially the width of a vehicle bed and having male coupling members extending therefrom; and two side panels each adapted to be transversely and hingedly mounted to an interior of a tailgate proximate a short side thereof and wherein each said side panel comprises openings thereon dimensioned to receive said male coupling members.

In accordance with still another embodiment of the present invention, a method for increasing vehicle bed functionality is provided. The method comprises the steps of: providing at least one rectangular panel having substantially the width of a vehicle bed and having male coupling members extending therefrom; mounting plates to interior walls of said vehicle bed wherein said mounting plates have openings thereon dimensioned to receive said male coupling members; and positioning said rectangular panel alternatively in an orientation that is parallel to a floor of said vehicle bed and an orientation that is perpendicular to a floor of said vehicle bed.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
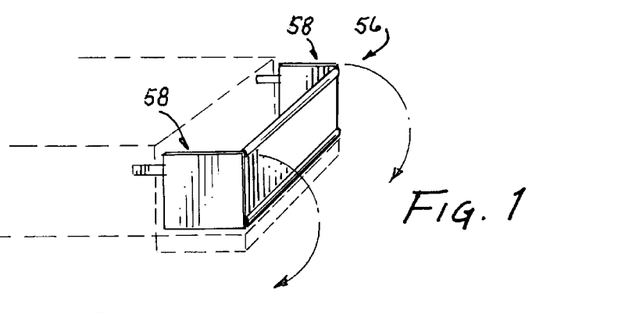
FIG. 1 is a perspective view of the modular system of the present invention, configured as a truck bed extender.
Figure 2:
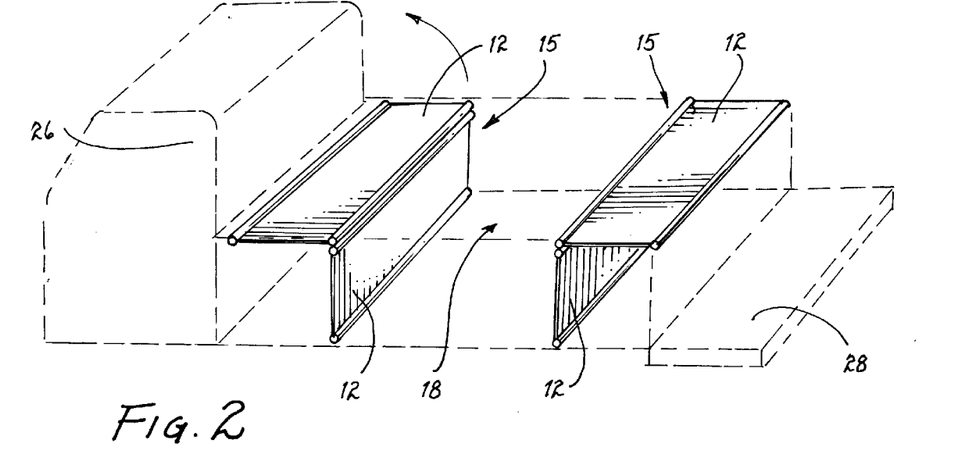
FIG. 2 is a perspective, cut-away view of the modular system of the present invention, configured as storage units.
Figure 8A:
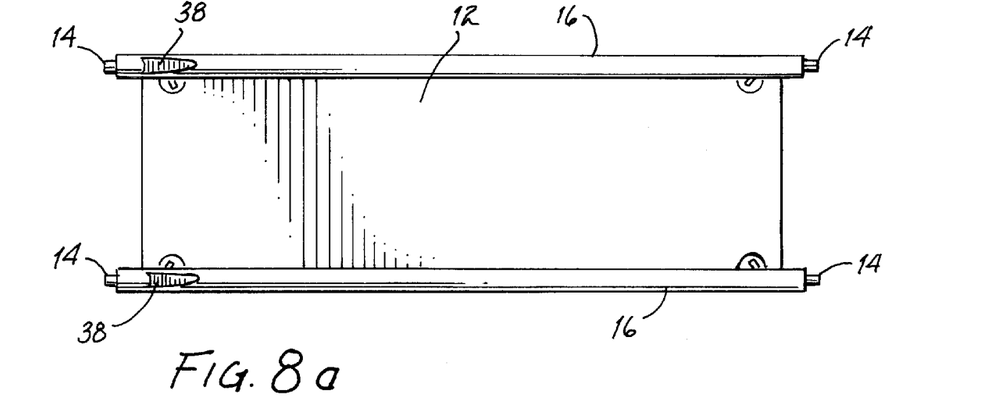
FIG. 8a is a bottom view of a panel comprising an element of the modular system of the present invention.
Figure 8B:
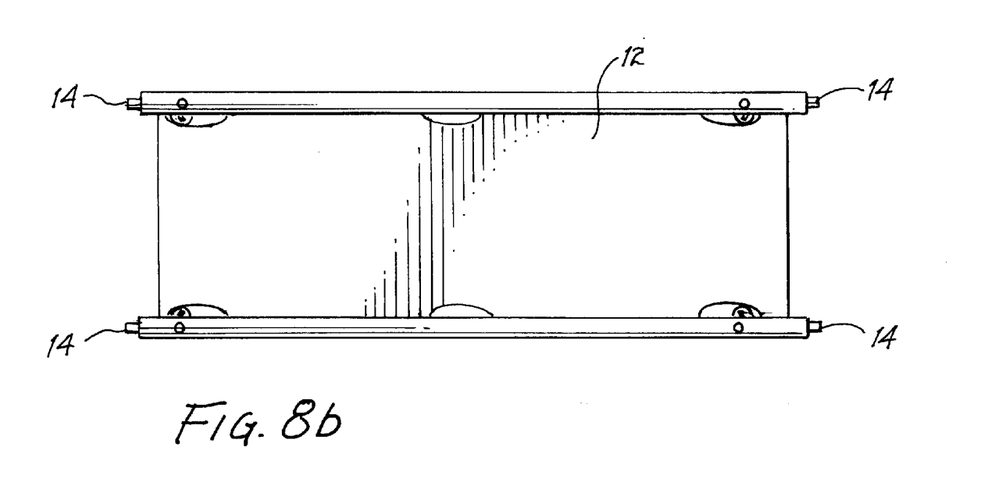
FIG. 8b is a top view of a panel comprising an element of the modular system of the present invention.
Figure 10:
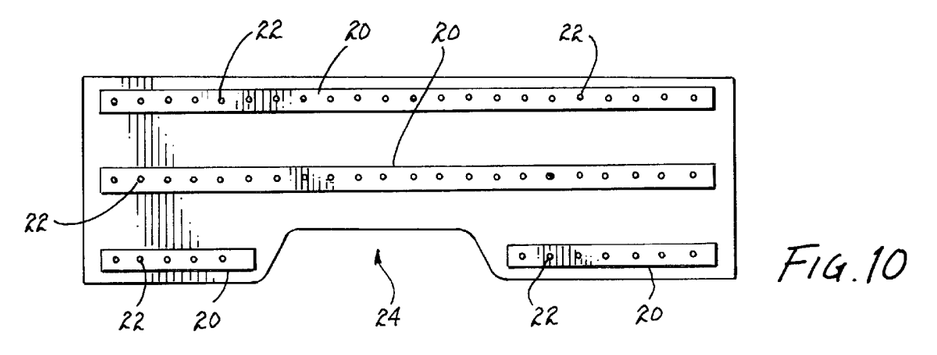
FIG. 10 is a front view of a side of a truck bed, illustrating the preferred position of mounting plates having openings thereon and dimensioned to receive individual panels.

Referring first to FIGS. 8a, 8b, and 10, certain of the main components of the modular system of the present invention are shown. As shown in FIGS. 8a 8b, the main building block of the modular system is the panel 12, which panel 12 is rectangular in shape and has pins 14 projecting from each of the four corners of the panel 12 from the ends of the long sides 16 of the panel 12. The length of the panel 12 should be substantially that of the width of the vehicle bed 18 (see, e.g., FIG. 2), with the panel adapted to be adjustable in length (see FIG. 19) or coming in a plurality of sizes to accommodate different bed widths. The panel 12 should be formed of any desired material having the qualities of durability, strength, etc., such as steel, plastic, etc. The panel 12, could also be comprised of a steel mesh type of material, particularly if it is desired to provide a panel 12 having decreased wind resistance.

Referring to FIG. 10, the interior sides of a vehicle bed 18 are lined with plates 20 (which may be bolted, welded or otherwise affixed to the interior sides), into which plates 20 are formed openings 22 dimensioned to receive the pins 14. Preferably, as shown in FIG. 10, there are three levels of plates 20 for each interior side of the vehicle bed 18—one near the upper edge, one near the lower edge, and one in the middle. (The plate 20 near the lower edge may need to be separated into two segments to accommodate a wheel well 24, as shown in FIG. 10.) As an alternative to three levels of plates 20, it would be possible to provide on each interior side of a vehicle bed 18 a single plate 20, having thereon a plurality of openings 22—preferably in at least three levels, and more if additional angle variations are desired. It would be possible still further for the openings 22 to be made directly in the interior sides of the vehicle bed 18, in which case the interior sides will themselves be the plates 20.

Referring now to FIGS. 2–4 and 6, it can be seen how the modular system of the present invention can be formed into different features improving the functionality of the vehicle bed 18, utilizing these basic components. Thus, referring first to FIG. 2, the formation of storage compartments 15 is shown, by placing a first panel 12 in an orientation that is perpendicular to the floor of the vehicle bed 18, and a second panel 12 abutting and perpendicular to the first panel 12 and in an orientation that is proximate the upper edge of the vehicle bed 18 and parallel to the floor thereof—with the panels 12 being positioned proximate the cab 26, proximate the tail gate 28, or both. With respect to a storage compartment 15 being formed proximate the cab 26, the four sides of the storage compartment 15 consist of the two panels 12, the floor of the vehicle bed 18, and the cab 26. With respect to a storage compartment 15 being formed proximate the tailgate 28, the four sides of the storage compartment 15 consist of the two panels 12, the floor of the vehicle bed 18, and the tailgate 28. The panels 12 for the storage compartment 15 are positioned by inserting the pins 14 (not shown) into the openings 22 in the plates 20 (not shown).

Figure 24:
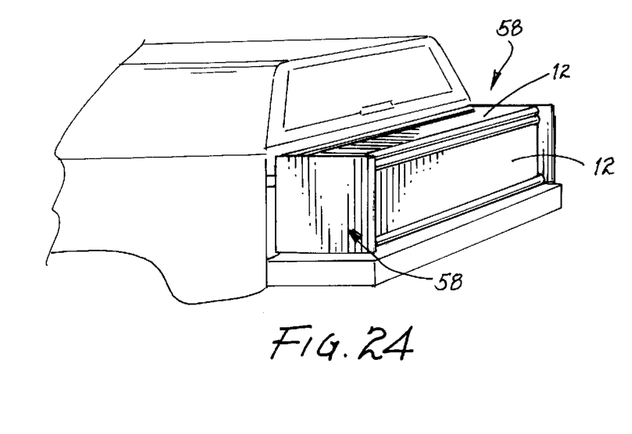
FIG. 24 is a perspective view of the modular system of the present invention, configured as a storage box located on the tailgate.

Referring now to FIG. 24, the formation of the storage component 15 atop the tailgate 28 is shown. In this embodiment, the four sides of the storage component 15 consist of the interior of the tailgate 28, and three panels 12, with side panels 58 (discussed below) forming the ends of the storage component 15. The advantage of this embodiment is that the storage component 15 can be positioned exterior of the vehicle bed 18.

Figure 3:
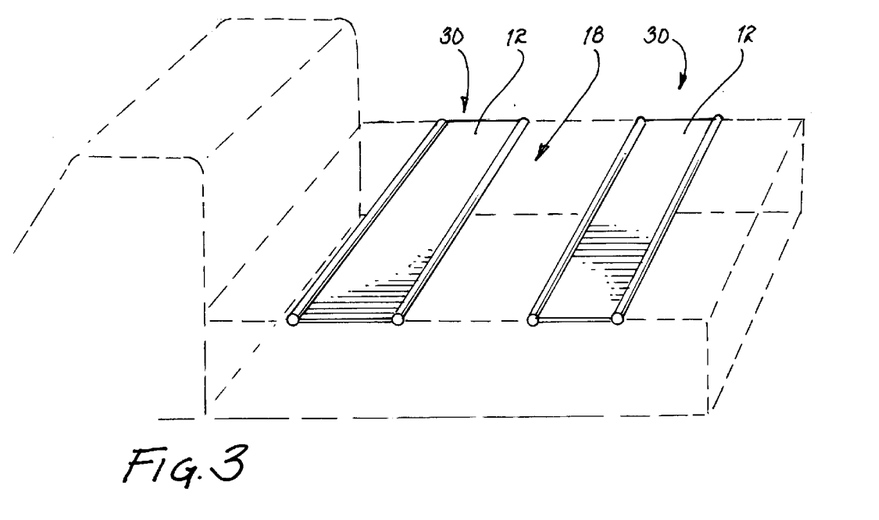
FIG. 3 is a perspective view of the modular system of the present invention, configured as a rack system.

Referring now to FIG. 3, the formation of racks 30 is shown. Each rack 30 is formed by placing a panel 12 in an orientation that is parallel to the floor of the vehicle bed 18, and preferably proximate the upper edge of the sides of the vehicle bed 18. In this regard, the panel (s) 12 is positioned by inserting the pins 14 (not shown) into the openings 22 in the plates 20 (not shown) at the desired level. A single rack 30 may be used to accommodate a vehicle—such as a bicycle or motorcycle—in a transverse orientation relative to the vehicle bed 18, or two racks 30 may be used to accommodate such a vehicle positioned in alignment with the vehicle bed 18, with one wheel on each rack 30. It would also be possible to position a four-wheeled vehicle in a transverse orientation in relation to the vehicle bed 18, with two wheels resting on each of the racks 30. One or two racks 30 may, of course, be used for cargo other than vehicles, such as furniture, lumber, etc.

Figure 4:
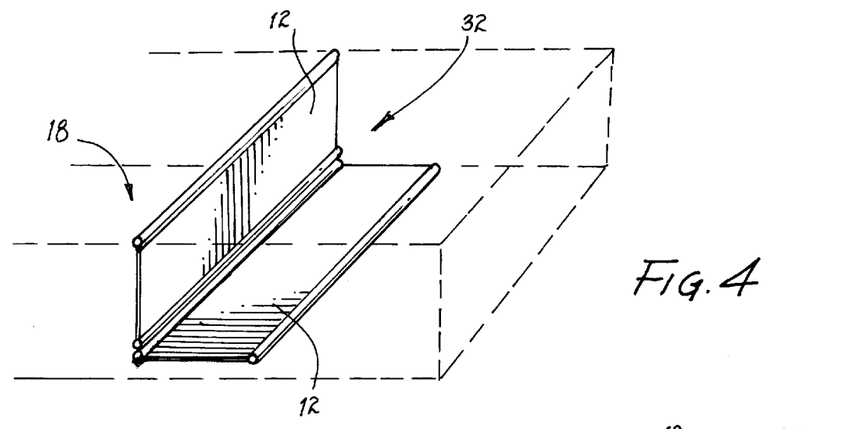
FIG. 4 is a perspective view of the modular system of the present invention, configured as a seat.

Referring now to FIG. 4, the formation of a seat 32 is shown. A seat 32 is formed by placing a first panel 12 in an orientation that is perpendicular to the floor of the vehicle bed 18 to form the seat back, and a second panel 12 abutting the first panel 12 and perpendicular thereto and in an orientation that is parallel to the floor of the vehicle bed 18 to form the seat bottom. Again, the panels 12 are positioned by inserting the pins 14 (not shown) into the desired openings 22 in the plates 20 (not show) so as to place the seat 32 at the desired height and position in the vehicle bed 18.

Figure 25:
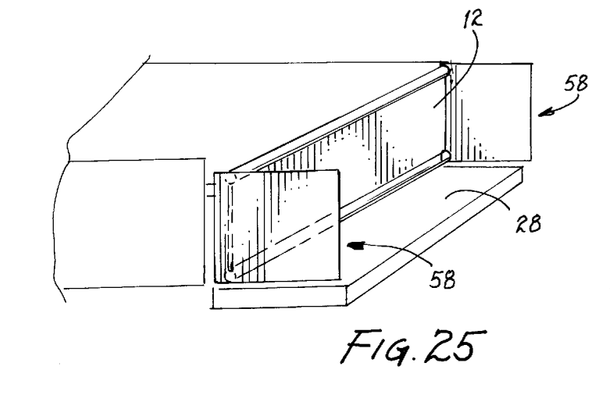
FIG. 25 is a perspective view of the modular system of the present invention, configured as a seat located on the tailgate.

As shown in FIG. 25, the seat 32 can also be formed on the tailgate 28, with a panel 12 being installed vertically at approximately the end of the vehicle bed 18, the open tailgate 28 serving as the seat bottom, and side panels 58 (discussed below) optionally forming sides of the seat 32.

Figure 6:
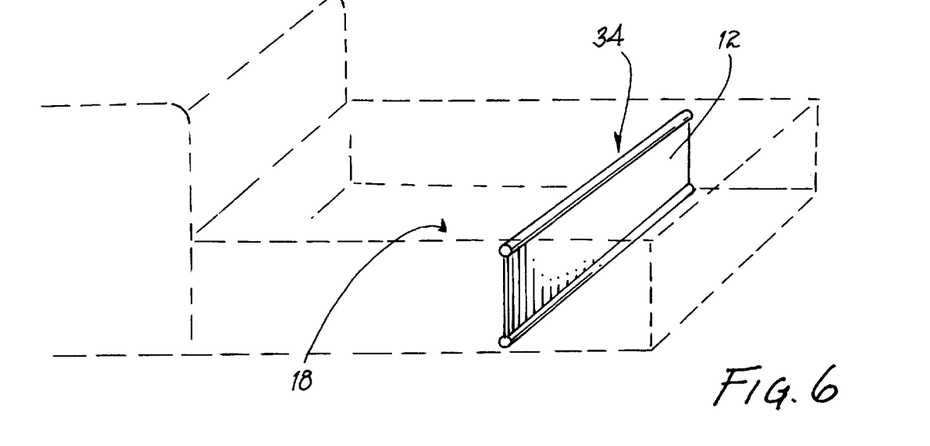
FIG. 6 is a perspective view of the modular system of the present invention, configured as a truck bed divider.

Referring now to FIG. 6, the formation of a bed divider 34 is shown. A bed divider 34 is formed by placing a single panel 12 in an orientation that is perpendicular to the floor of the vehicle bed 18, creating two sub-compartments within the vehicle bed 18. Once the bed divider 34 is in position, a user may place items on either side of the bed divider 34, with the bed divider 34 acting to keep such items separate. If desired, more than one bed divider 34 may be installed, to create more than two sub-compartments within the vehicle bed 18.

Figure 7:
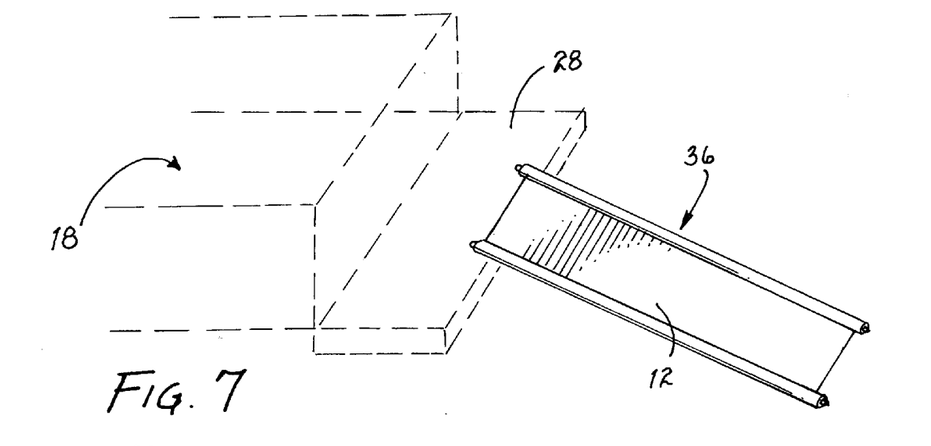
FIG. 7 is a perspective view of the modular system of the present invention, configured as a ramp.
Figure 9:
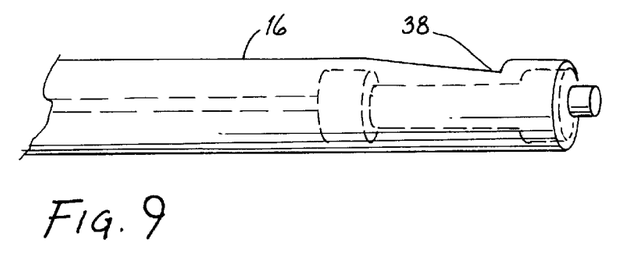
FIG. 9 is a side, cut-away view of a portion of a panel comprising an element of the modular system of the present invention, showing a recessed area permitting the use of the panel as a ramp.

Referring now to FIGS. 7, 8, and 9, the formation of a ramp 36 is shown. Referring first to FIG. 7, the ramp 36 is formed by placing a panel 12 so that one end rests upon the tailgate 28 and the other rests upon the ground. Depending on the type of vehicle or other item to be loaded into the vehicle bed 18, one or more ramps 36 may be employed. Attention is now drawn to FIGS. 8a and 9. In order to ensure that the panel 12 does not become dislodged from the tailgate 28 during loading of an item into the vehicle bed 18, notches 38 are preferably formed proximate parallel ends of two of the long sides 16 of the panel 12. The notches 38 are to be positioned over the edge of the tailgate 28 to permit the panel 12 to grip the tailgate 28 and not become dislodged therefrom during loading. (While in the preferred embodiment notches 38 are provided to facilitate the gripping of the tailgate 28 by the panel 12, other structure could be provided on the panel 12, tailgate 28 or both to facilitate such gripping without departing from the spirit or scope of the present invention.)

Figure 17:
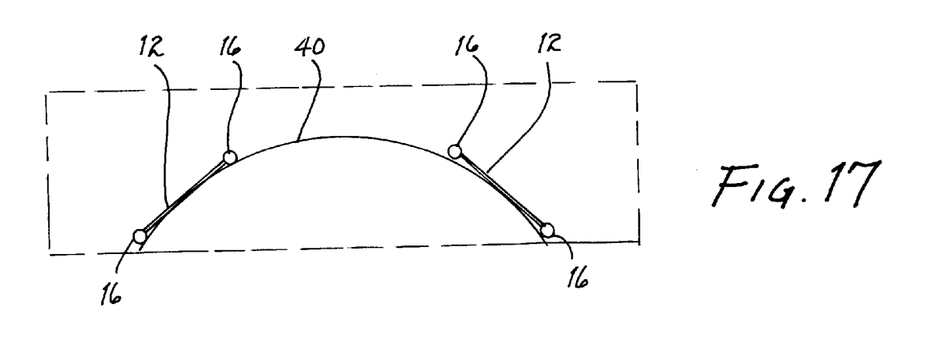
FIG. 17 illustrates a side view of the modular system of the present invention, configured in a manner to help in the securing of a load on the truck bed.

Referring now to FIG. 17, it can be shown how two panels 12 can be used to assist in the securing of a load (not shown) carried therebetween in the vehicle bed 18. As shown in FIG. 17, panels 12 can be installed in the vehicle bed 18 in an angled manner, with the upper long sides 16 of each panel 12 closer to each other than the lower long sides 16. As discussed with respect to other embodiments, the panels 12 are secured in position by the insertion of pins 14 (not shown) into openings 22 in the plates 20 (not shown). This orientation has the affect of partially covering the load (not shown). To further secure the load, it would be possible to extend a tarp 40 or other covering between the panels 12.

Figure 18:
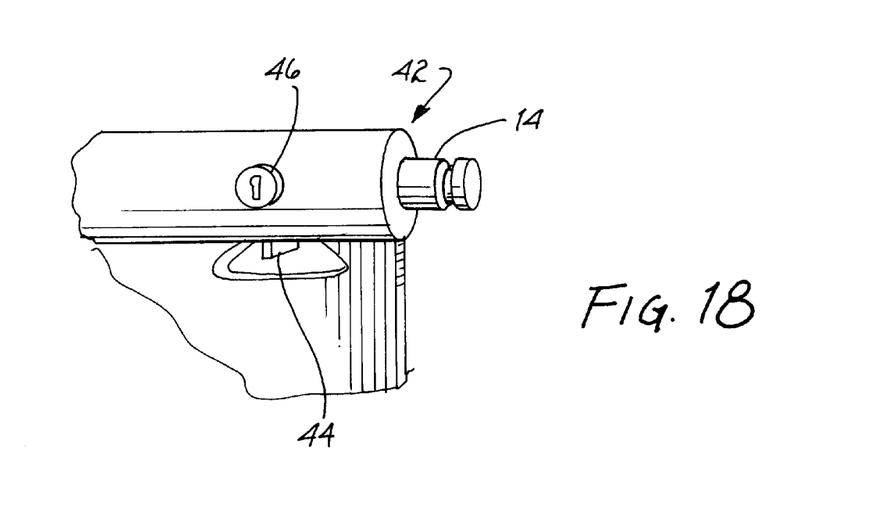
FIG. 18 is a perspective view of an embodiment of one of the locking pins located on a panel comprising an element of the modular system of the present invention.

Referring now to FIG. 18, one embodiment of a pin extending system 42 is shown. In this embodiment, the pin 14 is extended or retracted by activation of a lever 44, which lever 44 is linked to pin 14 in such manner so as to cause the pin 14 to retract when the lever 44 is moved in a first direction, and to cause the pin 14 to extend when the lever 44 is moved in an opposite, second direction. A lock 46 is also provided to prevent retraction of the pin 14 once inserted into an opening 22 (not shown), thereby making the panel 12 more secure in position and reducing the possibility of theft of a panel 12 or materials beneath the panel 12, for example when panels 12 are used to form a storage compartment 15.

Figure 19:
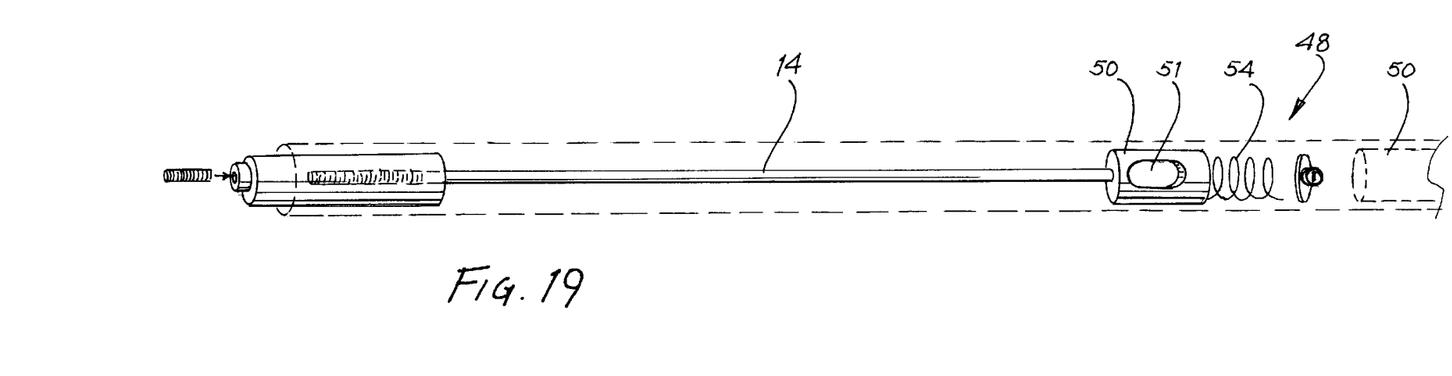
FIG. 19 is a front, cross-sectional view of another embodiment of the locking pins located on a panel comprising an element of the modular system of the present invention.
Figure 20:
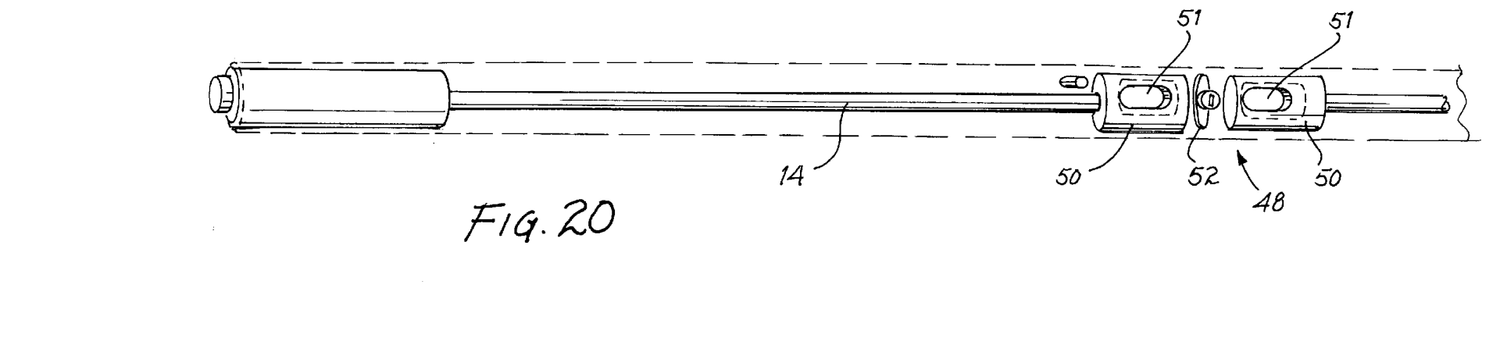
FIG. 20 is a front, cross-sectional view of another embodiment of the locking pins located on a panel comprising an element of the modular system of the present invention.

Referring now to FIGS. 19–20, a pin extending system 48 is shown. In this embodiment, pins 14 project from substantially a center portion of a long side 16 of a panel 12. Each pin 14 is coupled to a base 50, which base 50 is coupled to a lock/lever 52 with a spring 54 (see FIG. 19). Turning of the lock/lever 52 away from its perpendicular orientation as shown in FIGS. 19 and 20 causes movement of the spring 54 in the direction of the bases 50, in turning causing extension of the pins 14 toward the openings 22 (not shown). Turning of the lock/lever 52 back toward the perpendicular orientation causes retraction. Alternatively, retraction of the pins 14 can be caused by grasping the bases 50, preferably through openings 51 therein, and squeezing them toward each other against the pressure of the spring 54—with the bases 50 and pins 14 being allowed to return to their extended position upon release of the bases 50.

Figure 11:
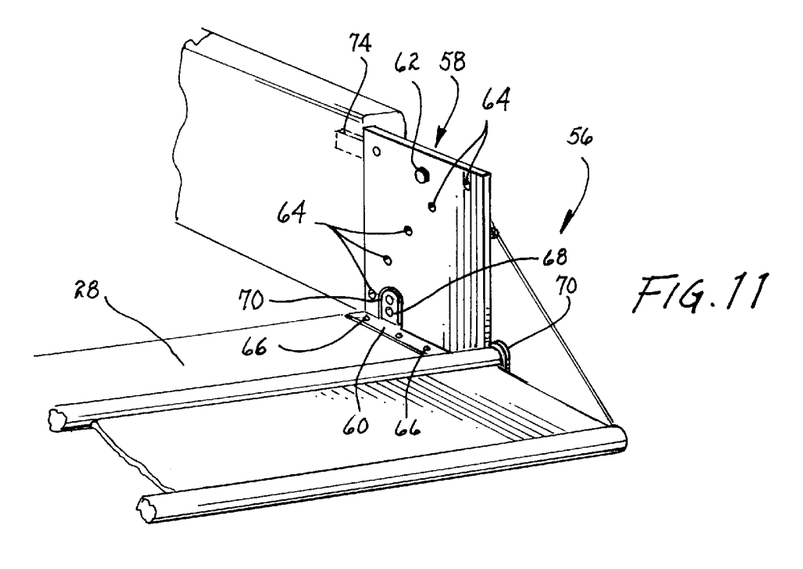
FIG. 11 is a partial perspective view of the modular system of the present invention, configured as a truck bed extender and in the open position.
Figure 12:
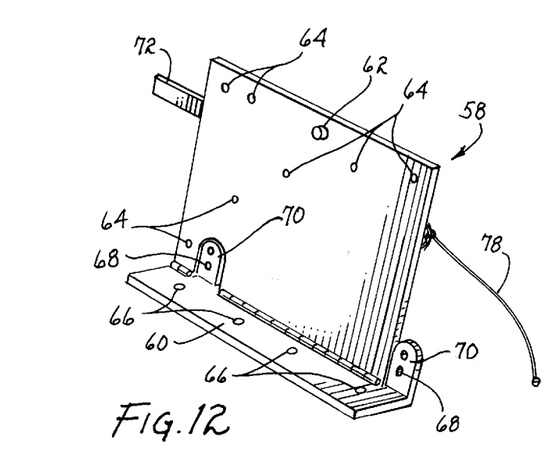
FIG. 12 is a perspective view of a side panel of the truck bed extender embodiment of the present invention.

Referring now to FIGS. 1 and 11–16, the component portions and formation of a vehicle bed extender 56 is shown. The vehicle bed extender 56 comprises three main components—a panel 12 forming the tailgate of the vehicle bed extender 56, and two side panels 58. The panel 12 is as described above. With respect to the side panels 58, attention is particularly drawn to FIGS. 11–13 and 16. Each side panel 58 is hingedly coupled to a plate 60, which plate 60 is secured to the inside of the tailgate 28. (The term "side panel" as used herein, including in the claims, refers to either the side panel 58 or the combination of the side panel 58 and plate 60.) The hinged coupling of the side panels 58 to the plates 60 permits the side panels 58 to be folded against the tailgate 28 when the vehicle bed extender 56 is not in use. Referring to FIGS. 11 and 12, a rubber stop 62 is preferably positioned proximate an upper interior edge of each side panel 58, so that when the side panels 58 are folded against the tailgate 28, the rubber stops 62 will contact the tailgate 28 and prevent damage to the tailgate 28 and side panel 58 during transit and will also help prevent annoying sounds made if the side panels 58 and tailgate 28 were permitted to contact.

Still referring to the side panels 58, there are positioned thereon a plurality of openings 64, dimensioned to receive pins 14 from the panel 12. The plurality of openings 64 permits the panel 12 to be attached in a number of different positions, from a traditional upright position (see, e.g., FIG. 1) to a partially closed position for purposes of helping to secure a load in the vehicle bed 18. Moreover, openings 64 are positioned in the portion of the side panel 58 proximate the vehicle bed 18, so that a panel 12 can be positioned proximate the vehicle bed 18 rather than in the rearmost portion of the vehicle bed extender 56.

Figures 15, 16:
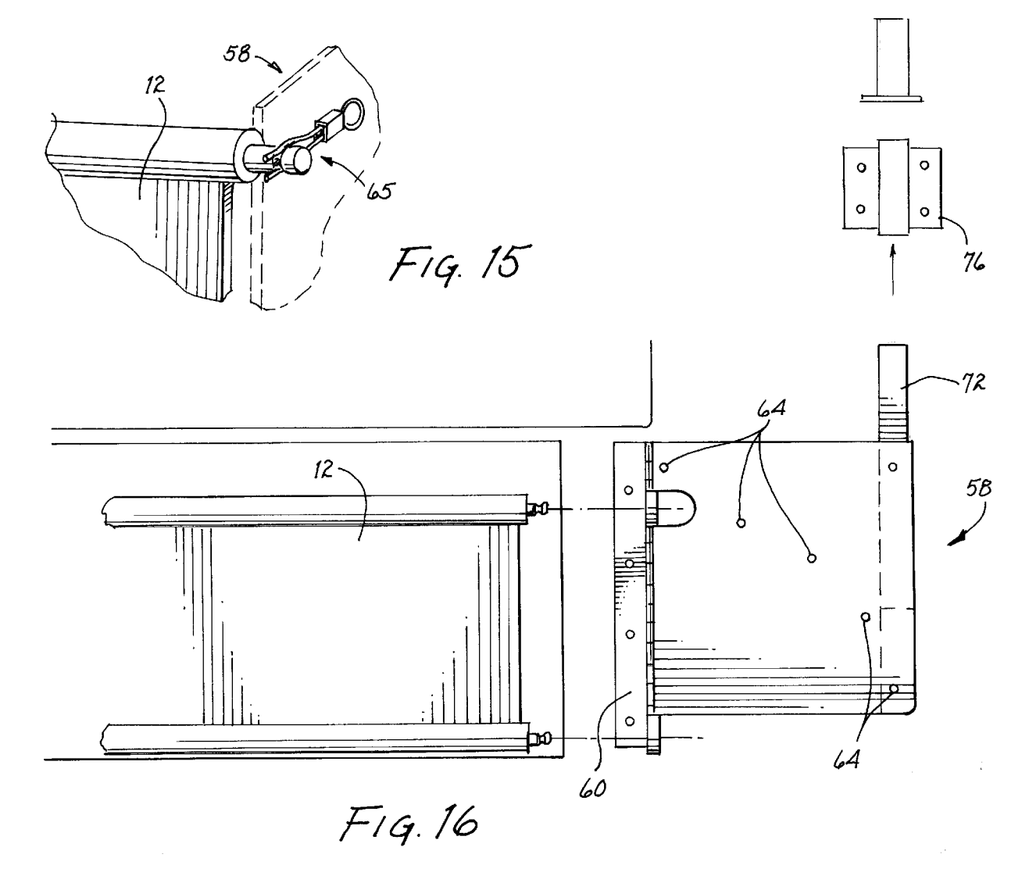
FIG. 15 is a perspective view of another embodiment of a latching mechanism for securing the rear gate of the truck bed extender embodiment of the present invention.
FIG. 16 is a top, exploded view of the rear gate and side panel of the truck bed extender of the present invention, illustrating the manner in which they couple together and the manner in which the side panel may be secured to the truck bed.

As shown in FIG. 15, it is preferred that at least the topmost opening 64 in the side panel 58 extending therethrough, so that the pin 14 extending from the panel 12 may be inserted therethrough, and more securely retained in position using a cotter pin type of security clip 65. Secure retention of the panel 12 in position as a tailgate is preferred to reduce the risk of the accidental opening of the panel 12 during travel—particularly when a load is being carried in the vehicle bed 18.

Referring now to the plates 60, these are affixed to the interior of the tailgate 28, preferably with bolts 66. The plates 60 are hingedly coupled to projections 70 having openings 68 thereon. The openings 68, like the openings 64 and 22, are dimensioned to receive the pins 14. As shown in FIG. 14, the openings 68 permit the panel 12 to be placed in a fully closed position against the tailgate 28.

Figure 13:
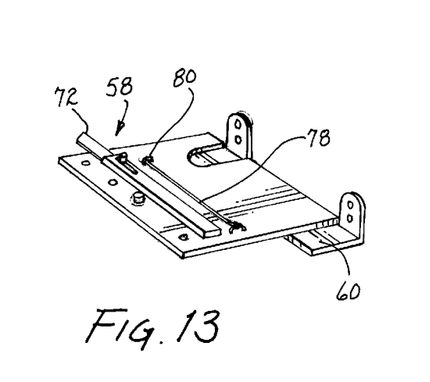
FIG. 13 is a perspective view of a side panel of the truck bed extender embodiment of the present invention, in a closed position against the tailgate.
Figures 13A, 14:
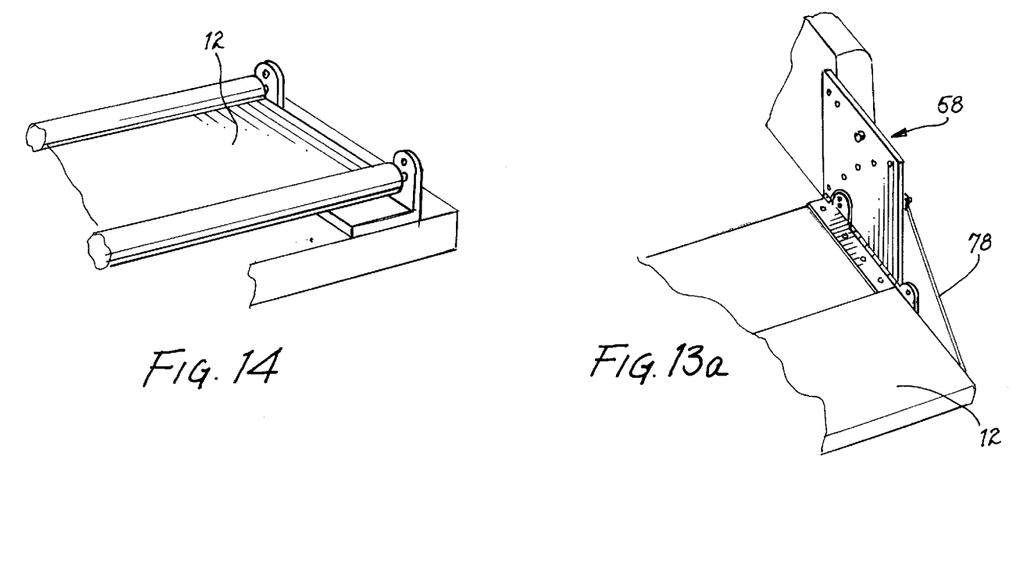
FIG. 13a is a perspective view of the truck bed extender embodiment of the present invention, in an open position.
FIG. 14 is a perspective view of the rear gate of the truck bed extender embodiment of the present invention, in a closed position against the tailgate.

Referring now to FIGS. 11–13, a retractable latch 72 is positioned on the side panels 58, preferably proximate an upper edge of the side panels 58 and parallel thereto, and extend in a direction that is toward the vehicle bed 18. Preferably, the latches 72 are received in a recess 74 within the side wall of the vehicle bed 18. Referring now to FIG. 16, in the alternative, a latch retaining plate 76 may be bolted or otherwise affixed to the side wall of the vehicle bed 18, in position to receive the latch 72.

Figure 16A:
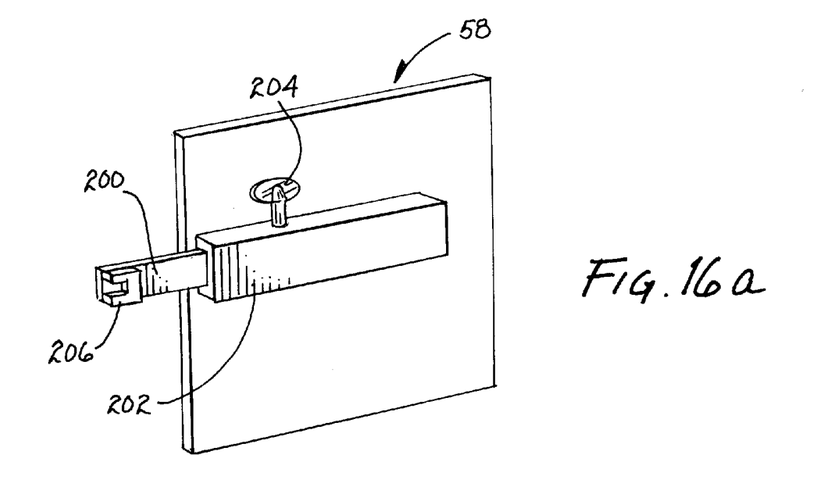
FIG. 16a is a front view of a side panel of the truck bed extender of the present invention, illustrating another manner in which the side panel may be secured to the truck bed.

FIG. 16a shows another way of coupling the side panels 58 to a vehicle. In this embodiment, the side panels 58 each have an arm 200 extending from a housing 202, and lockably retained within the housing 202 with a locking pin 204. At a distal end of the arm 200 is hardware 206 dimensioned to mate with the bolt or other hardware projecting from the truck and adapted to mate with the tailgate 28. For some trucks, a C-shaped structure as shown in FIG. 16a will perform such mating function, whereas for other trucks, hardware of a different shape will be required.

Referring to FIGS. 12 and 13, each of the side panels 58 preferably further has attached thereto one end of a support cable 78. When the vehicle bed expander 56 is not in use, the support cable 78 may be secured to a clip 80 located on the side panel 58. When the vehicle bed expander 56 is assembled, the free end of the support cable 78 is coupled to the panel 12, preferably about the pin 14 (not shown), as indicated in FIG. 13a.

Figure 5:
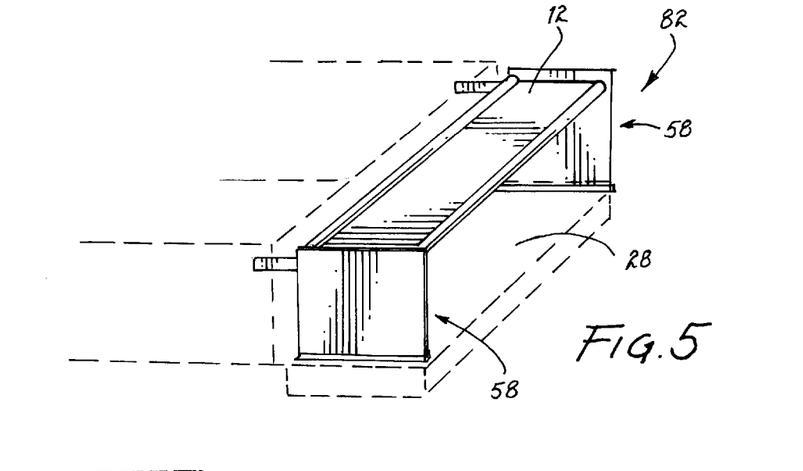
FIG. 5 is a perspective view of the modular system of the present invention, configured as a work shelf.

Referring now to FIG. 5, the formation of a work shelf 82 is shown. The work shelf 82 is formed by positioning a panel 12 in a horizontal orientation relative to the tailgate 28 in openings 64 in the side panels 58 proximate an upper edge thereof. In this manner, a user may utilize the panel 12 either to perform work thereon, or may perform work on the tailgate 28 or other nearby surface and use the panel 12 as a shelf to hold tools, materials, or other items needed in the course of such work.

Figure 21:
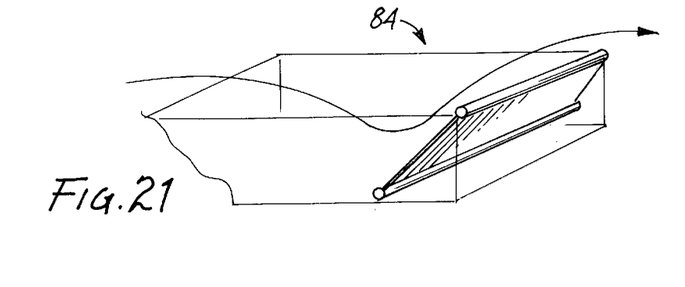
FIG. 21 is a perspective view of the modular system of the present invention, configured as a wind deflector.

Referring now to FIG. 21, the formation of a wind deflector 84 is shown. The wind deflector 84 is formed by positioning a panel 12 in an angled (i.e., non-horizontal, non-vertical) orientation in openings 22 in the plates 20. When properly positioned, the panel 12 will be positioned so that the side proximate the tailage 28 is higher than the side proximate the cab 26, and preferably substantially so.

Figures 22, 23:
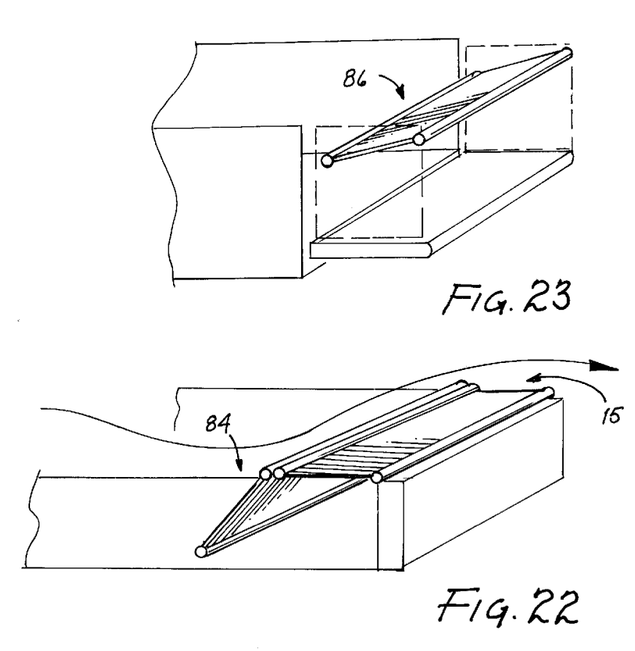
FIG. 22 is a perspective view of the modular system of the present invention, configured as a combination storage box and wind deflector.
FIG. 23 is a perspective view of the modular system of the present invention, configured as a spoiler.

Referring to FIG. 23, the formation of a spoiler 86 is shown. The spoiler 86 is similar to the wind deflector 84, with the differences being that (a) the spoiler 86 is formed in the side panels 58 above the tailgate—as opposed to the plates 20 in interior of the vehicle bed 18; and (b) the panel 12 is preferably not as dramatically angled; i.e., the side proximate the cab 26, while lower than the side proximate the tailgate 28, is not as dramatically lower as in the wind deflector embodiment.

Referring now to FIG. 22, it can be seen that the wind deflector 84 can be combined with the storage compartment 15, by angling the panel 12 proximate the cab 26 as discussed above with respect to FIG. 21.

Figure 26:
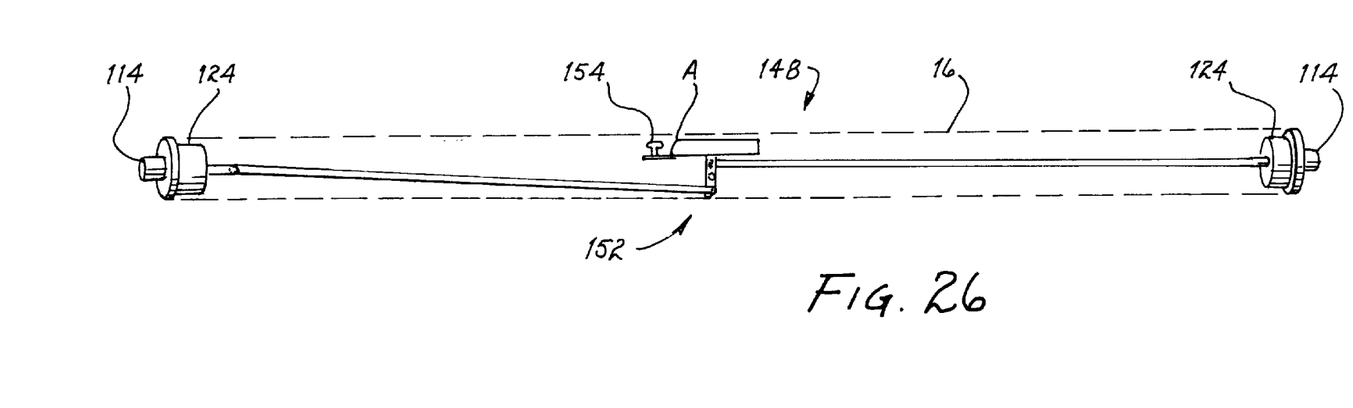
FIG. 26 is a front, cross-sectional view of another embodiment of the locking pins located on a panel comprising an element of the modular system of the present invention.
Figure 27:
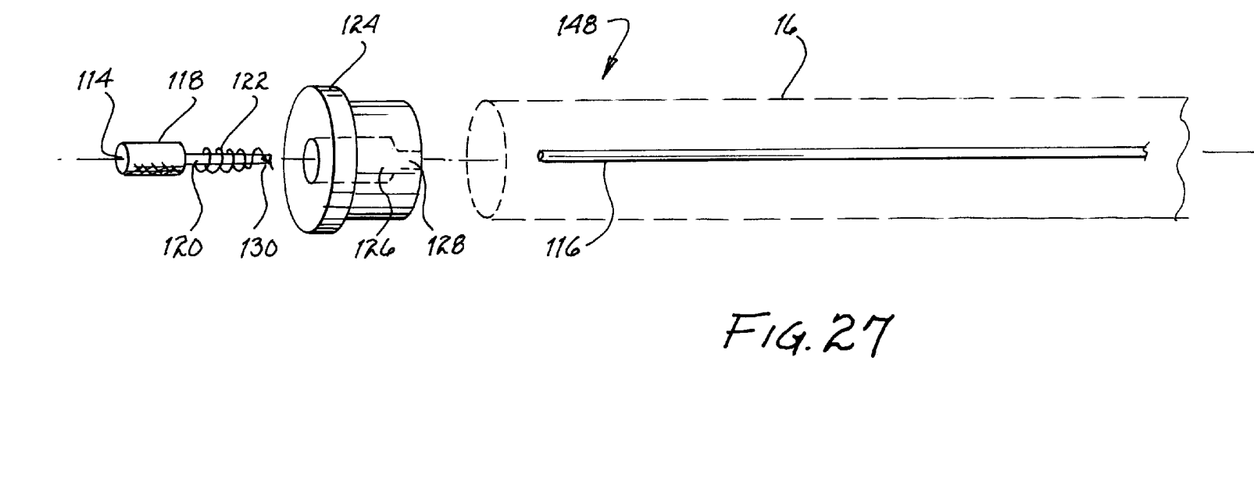
FIG. 27 is a partial front, cross-sectional, exploded view of another embodiment of the locking pins located on a panel comprising an element of the modular system of the present invention.

Referring now to FIGS. 26–27, a pin extending system 148 is shown. In this embodiment, pins 114 project from each end of a long side 16 of a panel 12. Each pin 114 is preferably cylindrical, and comprises an area 118 of greater diameter and an area 120 of reduced diameter. A spring 122 is positioned over the area 120 of reduced diameter, and the pin 114 is positioned within an open-ended end cap 124, which end cap 124 has an area 126 of greater diameter dimensioned to receive the area 118 and an area 128 of reduced diameter dimensioned to receive area 120 (with spring 122 remaining in area 126 and spring-biased therein). The pin 114 is seated within the end cap 124, and the pin 114 is coupled to a first end of a rod 116, preferably about an attachment point 130 located at an end of the pin 114.

Referring specifically to FIG. 26, a second end of each rod 116 is coupled to a lock/lever 152. Depression of the lock/lever 152 at point A will cause rotational movement, causing each pin 114 to retract and thus permitting the removal of a panel 12 from openings 22 or 58. A locking button 154 can be positioned below point A so as to prevent such depression, or retracted from such position so as to permit depression.

While the invention has been particularly shown and described with reference to preferred embodiments thereof, it will be understood by those skilled in the art that the foregoing and other changes in form and details may be made therein without departing from the spirit and scope of the invention. For example, while the modular system of the present invention may be fitted to an existing vehicle bed 18 by, for example, affixing plates 20 to interior sides of the vehicle bed 18, the system can be incorporated into a vehicle bed 18 during manufacture, by for example positioning openings 22 directly in the interior sides of the vehicle bed 18. In this regard, the tailgate 28 may be formed as a hollow unit, and may be dimensioned so as to receive therein one or more panels 12 for storage.

I claim:

1. A system for increasing vehicle bed functionality comprising, in combination:
   at least one rectangular panel having substantially the width of a vehicle bed and having male coupling members extending therefrom; and
   at least two mounting plates that are one of coupled to and comprising fixed, opposing interior walls of said vehicle bed;
   wherein each of said at least two mounting plates has openings thereon dimensioned to receive said male coupling members so that said rectangular panel can be positioned in an orientation ranging from parallel to a floor of said vehicle bed and raised therefrom to an orientation that is perpendicular to said floor of said vehicle bed without regard to whether a tailgate located at an end of said vehicle bed is in an open or closed configuration.

2. The system of claim 1 comprising at least two said rectangular panels and wherein said rectangular panels can be coupled to said mounting panels so as to form alternatively at least three of a rack, a bed divider, a storage compartment, a work shelf, a seat, and a wind deflector.

3. The system of claim 1 comprising at least two said rectangular panels and wherein said rectangular panels can be coupled to said mounting panels so as to form alternatively each of a rack, a bed divider, a storage compartment, a work shelf, a wind deflector and a seat.

4. The system of claim 1 comprising at least three mounting plates coupled to each said interior wall wherein one said mounting plate is located proximate an upper edge of said interior wall, one said mounting plate is located proximate a lower portion of said interior wall, and one said mounting plate is located approximately half-way between said upper edge and said lower portion of said interior wall.

5. The system of claim 1 wherein said rectangular panel further comprises means for locking said male coupling members in position in said openings.

6. A system for increasing vehicle bed functionality comprising, in combination:

at least one rectangular panel having substantially the width of a vehicle bed and having male coupling members extending therefrom;

mounting plates adapted to be mounted to interior walls of said vehicle bed and having openings thereon dimensioned to receive said male coupling members so that said rectangular panel can be positioned in an orientation ranging from parallel to a floor of said vehicle bed to an orientation that is perpendicular to said floor of said vehicle bed; and two side panels each adapted to be transversely and hingedly mounted to an interior of a tailgate proximate a short side thereof and wherein each said side panel comprises openings thereon dimensioned to receive said male coupling members.

7. The system of claim 6 wherein each said side panel further comprises a stop extending in the direction of the opposing said side panel and adapted to cushion the impact when said side panel is placed in a closed position against said interior of said tailgate.

8. The system of claim 6 wherein each said side panel further comprises a support cable extending therefrom and adapted to be coupled to said rectangular panel.

9. The system of claim 6 further comprising:

a retractable latch extending proximate an upper edge of said side panels and parallel to said upper edge and wherein each said retractable latch extends in a direction that is toward said vehicle bed; and a latch receiver coupled to walls of said vehicle bed and adapted to receive said retractable latch.

10. The system of claim 9 wherein said latch receiver comprises a plate coupled to said wall and having an opening therein dimensioned to receive said retractable latch.

11. The system of claim 1 wherein said rectangular panel further comprises means for engaging an edge of a tailgate coupled to said vehicle bed so that said rectangular panel may be deployed as a ramp leading from a ground area below said vehicle bed to said tailgate.

12. The system of claim 11 wherein said engaging means comprises notches located on an underside of said rectangular panel proximate said male coupling members.

13. A system for increasing vehicle bed functionality comprising, in combination:

at least one rectangular panel having substantially the width of a vehicle bed and having male coupling members extending therefrom; and two side panels each adapted to be transversely and hingedly mounted to an interior of a tailgate proximate a short side thereof and wherein each said side panel comprises openings thereon dimensioned to receive said male coupling members.

14. The system of claim 13 wherein each said side panel further comprises a stop extending in the direction of the opposing said side panel and adapted to cushion the impact when said side panel is placed in a closed position against said interior of said tailgate.

15. The system of claim 13 wherein each said side panel further comprises a support cable extending therefrom and adapted to be coupled to said rectangular panel.

16. The system of claim 13 further comprising:

a retractable latch extending proximate an upper edge of said side panels and parallel to said upper edge and wherein each said retractable latch extends in a direction that is toward said vehicle bed;

a latch receiver coupled to walls of said vehicle bed and adapted to receive said retractable latch.

17. The system of claim 16 wherein said latch receiver comprises a plate coupled to said wall and having an opening therein dimensioned to receive said retractable latch.

* * * * *